Patented Apr. 29, 1924.

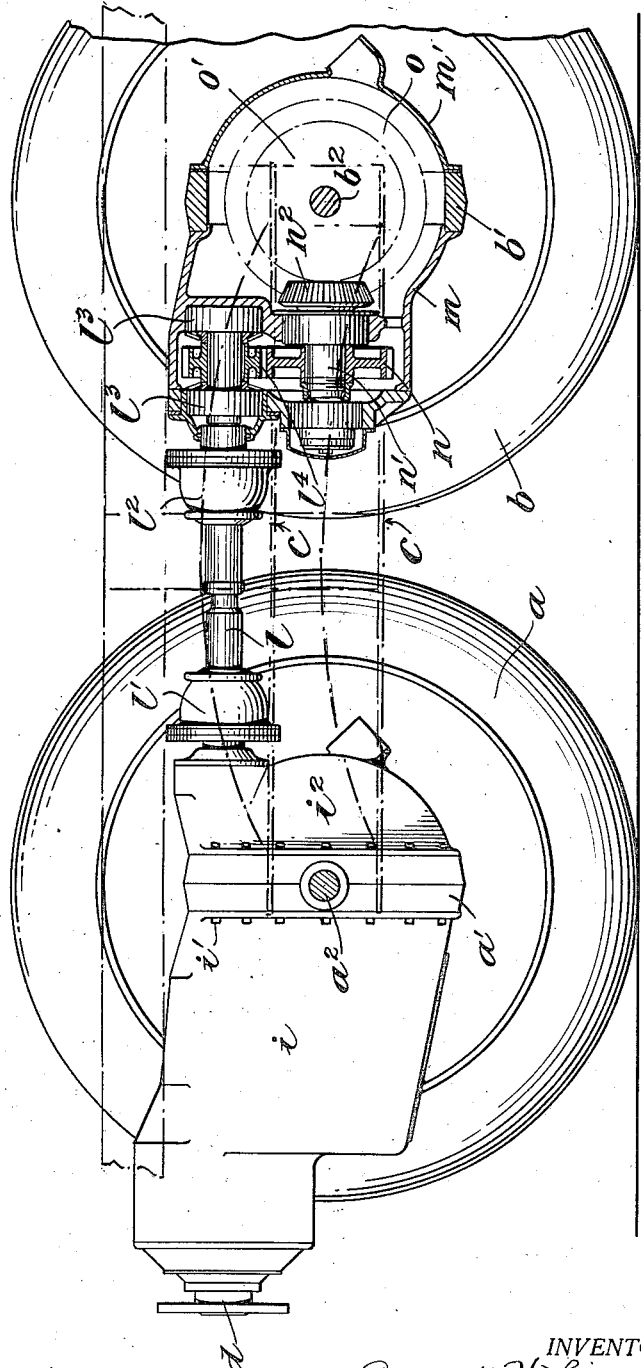

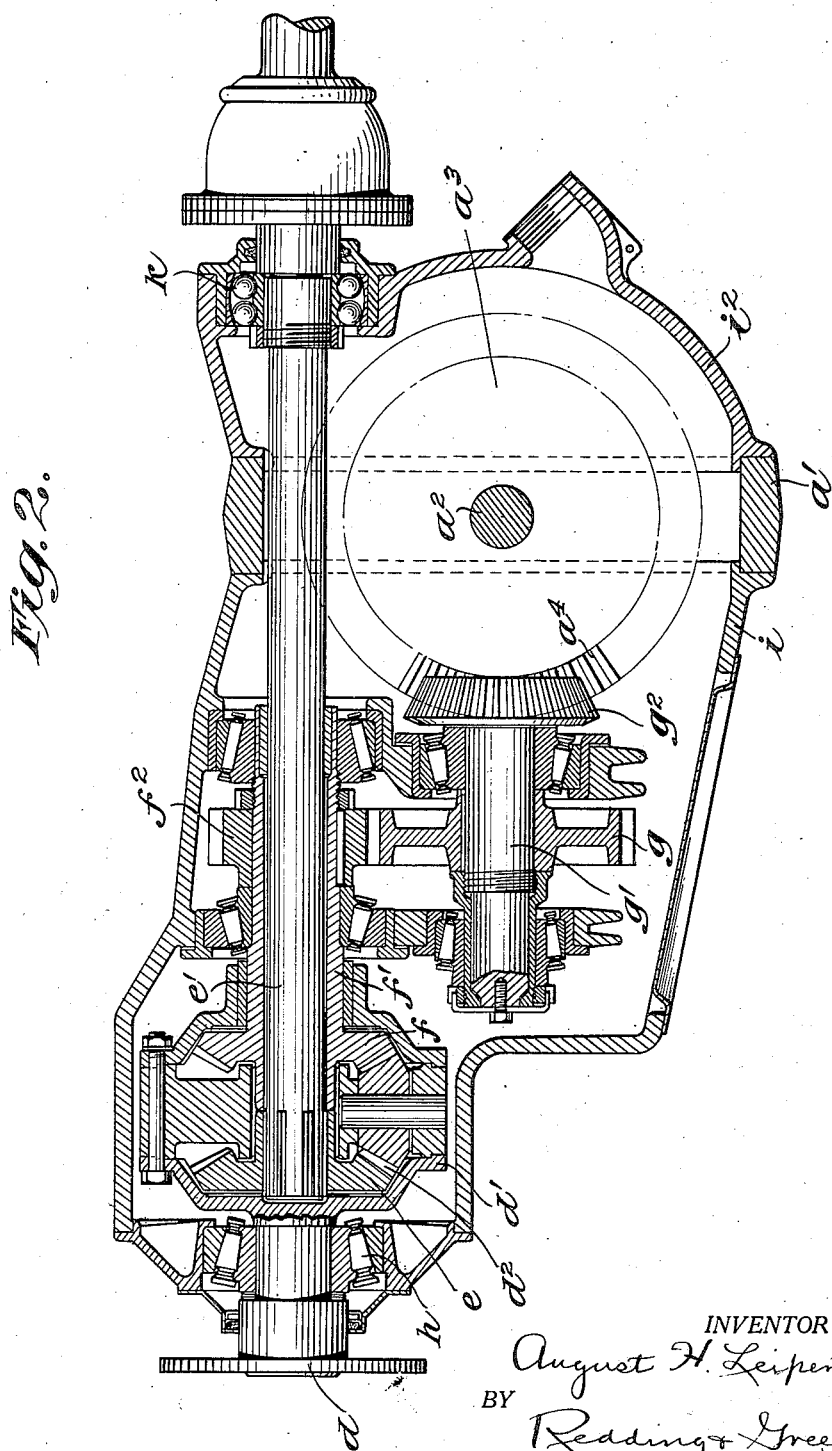

1,492,380

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

DRIVE FOR MOTOR VEHICLES.

Application filed November 6, 1922. Serial No. 599,387.

*To all whom it may concern:*

Be it known that I, AUGUST H. LEIPERT, a citizen of the United States, residing in the borough of Queens of the city of New York, in the State of New York, have invented certain new and useful Improvements in Drives for Motor Vehicles, of which the following is a specification, reference being had to the accompanying drawings, forming a part hereof.

This invention relates to certain improvements in a rear drive operating generally in accordance with the principles disclosed in Letters Patent of the United States No. 1,402,301, dated January 3, 1922, and embodying all of the advantages pointed out with respect to such drives and offering, in addition, certain advantages not to be found in the particular embodiment illustrated in said patent.

In the present invention it is proposed to provide for the operative interposition of a differential gear between the propeller shaft and each of a plurality of differential gears provided in connection with each pair of live axle sections, but, particularly, to improve the power transmission devices between said propeller shaft and each such differential gear for the live axle sections.

It is further proposed, in accordance with the invention to provide in combination with a dead axle of the "banjo" type housing sections which are carried thereby and completely incase the additional differential gear and so many of the separate transmission elements associated therewith as serve immediately to transmit power to the different sets of live axle sections. The improved mounting and housing thus provided for permits the inclusion of a transmission shaft in line with the propeller shaft and disposed within the "banjo" section of the dead axle. It also facilitates the provision of spur reduction gearing between the additional differential gear and the final drive bevel pinion.

Still another object of the invention, in its specific embodiment, is to provide in a multiple final drive double reduction gearing between the additional differential gear and each of the differential gears for the pairs of live axle sections.

The preferred embodiment of the invention will be described with reference to the accompanying drawings in which:

Figure 1 is a view partly in side elevation and partly in section showing a tandem rear drive embodying the improvements and indicating conventionally one of the wheels of each of a pair of driving wheels for the vehicle.

Figure 2 is a detail view in section on a somewhat larger scale showing the internal construction of the housing containing the additional differential gear and showing the double reduction drive between it and the differential for one of the pairs of live axle sections.

In the drawings there are indicated two pairs of rear drive wheels $a$, $b$, for a motor vehicle constituting what is termed a tandem drive. The dead axles $a'$, $b'$ on which these wheels are supported are of the "banjo" type having an enlarged mid-section of generally circular form disposed in a vertical plane. Figure 1 is a view which shows one of the "banjo" sections $a'$ in elevation and one of the "banjo" sections $b'$ in vertical section. The axles are connected yieldingly by springs indicated conventionally at $c$ and the frame of the vehicle is carried on these springs in a conventional manner. The principal problem with which the present invention is concerned is that of driving the live axle sections $a^2$, $b^2$, of the two sets of wheels $a$, $b$, from the propeller shaft $d$ in such manner that not only will each wheel of the pair be afforded the usual differential movement with respect to the other wheel of the pair but each pair of wheels will be afforded a differential movement with respect to the other pair of wheels. Stated in a different way, it is proposed to interpose a differential gear between the propeller shaft $d$ and each of the differentials for each of the pairs of live axle sections.

Reference is to be had first to Figure 2 for an understanding of the manner in which the pair of live axle sections $a^2$ of the foremost of the rear pair of wheels is driven from the propeller shaft $d$. The live axle sections $a^2$ are driven operatively from a differential gear indicated conventionally at $a^3$ which has a ring gear $a^4$ by which it is driven. The differential $a^3$ affords differential action between the live axle sections $a^2$ in the usual manner. The propeller shaft $d$ carries therewith or has secured thereto a differential housing $d'$ in which are supported a plurality of planetary pinions $d^2$ revoluble therewith. These pinions mesh with bevel gears $e$, $f$, in a manner commonly employed in differentials of this type, one of these driving gears $e$ being keyed to a drive shaft $e'$ which is connected operatively with the live axle sections $b^2$, in a manner to be hereinafter described and the other of said bevel gears $f$ being carried with or otherwise secured to a hollow shaft $f'$ through which the shaft $e'$ extends. The hollow shaft $f'$ has keyed thereto a spur pinion $f^2$ which is meshed with a spur gear $g$ on a shaft $g'$ carrying a final drive bevel pinion $g^2$ which is meshed with the ring gear $a^4$ on the differential $a^3$. All of the parts described are journaled in suitable bearings $h$ carried within a housing section $i$ which is bolted as by bolts $i'$ to the "banjo" section of the axle $a'$. The through shaft $e'$ which is keyed to the bevel gear $e$ is disposed in prolongation of the propeller shaft $d$ and extends through the "banjo" section $a'$ and may be journaled at its rear end by bearings $k$ in a complementary housing section $i^2$ bolted on the other side of the "banjo" section $a'$ by the same bolts $i'$ which may extend through the "banjo" section. The housing formed by the two sections $i$, $i^2$, completely incases all of the transmission elements driven from the propeller shaft $d$ including the differential $a^3$ and the double reduction gearing. The double reduction gearing described is compact and effective for transmitting the driving effort from the propeller shaft $d$ to the differential $a^3$.

The manner of driving the rear pair of live axle sections $b^2$ from the differential gear $d'$ will now be considered. The shaft $e'$ which is driven from the bevel gear $e$ of the differential $d'$ extends through the housing section $i^2$ and is connected to an exposed shaft section $l$ which may be of telescopic form. The universal joints $l'$, $l^2$, may be interposed in the shaft section $l$ to facilitate relative movement between the two axles $a'$ and $b'$. The shaft section $l$ extends into a housing section $m$ which may be bolted onto the "banjo" section $b'$ of the rearmost axle and is journaled in bearings $l^3$ carried in said housing section. A spur pinion $l^4$ is keyed or otherwise secured to the shaft $l$ within the housing $m$ and meshes with a spur gear $n$ which is carried on a stub shaft $n'$ carrying a final drive bevel pinion $n^2$ which meshes with a ring gear $o$ carried with a differential indicated conventionally at $o'$ and operatively interposed in the usual way between the live axle sections $b^2$. A rear housing section $m'$ may be bolted onto the other side of the "banjo" section $b'$, through bolts serving to secure both sections $m$, $m'$, to the axle in much the manner described with respect to the housing sections $i$, $i^2$, on the other axle $a'$.

Since the final drive for the differential $o'$ is effected from the shaft $e'$ which carries one of the bevel gears $e$ of the differential $d'$ and the other differential gear $a^3$ receives its power from the other bevel gear $f$ of said differential $d'$ it is evident that the two differentials $o'$ and $a^3$ may have a differential movement with respect to each other, that is, with respect to the propeller shaft $d$, and at the same time, each of said differentials $o'$, $a^3$, affords the usual differential movement betwen the live axle sections $b^2$, $a^2$, driven thereby, respectively. Double reduction of the power in the final drive is afforded by the spur and bevel gear construction described. The parts associated with each of the final drives at each axle are effectively housed. Power is transmitted through horizontal alined shafting.

What I claim is:

1. In a motor vehicle, a plurality of pairs of drive wheels, driving axle sections for each of the wheels, differential gears interposed between the axle sections of each pair of wheels, a propeller shaft, a differential gear operatively connected with the propeller shaft, shafting alined with the propeller shaft and operatively connected with said last named differential gear, and double reduction gearing interposed between said shafting and each of said first named differential gears, respectively.

2. In a motor vehicle, a plurality of pairs of drive wheels, dead axle sections on which said wheels are carried, respectively, the axle sections carrying one of said pairs of wheels having a vertically disposed "banjo" portion at its mid-section, driving axle sections for each of the wheels, differential gears interposed between the axle sections of each pair of wheels, a propeller shaft, a second shaft disposed in substantial alinement with said propeller shaft and extending through said "banjo" portion, and an operative connection between the propeller shaft and each of said differential gears including a differential gear and said alined shaft.

3. In a motor vehicle, a tandem rear drive comprising dead axles having "banjo" portions vertically disposed and on which the pairs of wheels are mounted, driving shaft sections for each of the wheels, differential gears interposed between the shaft sections of each pair of wheels, a propeller shaft, a second shaft disposed in substantial alinement with said propeller shaft and extending through one of the "banjo" portions of one of the dead axles, an operative driving connection between the propeller shaft and each of said differential gears including a differential gear and said alined shaft, and housing sections secured to the "banjo" portion of the last-named dead axle and enclosing the second named differential gear and alined shafting and the driving connections between said second named differential gear and one of the first named differentials driven therefrom.

4. In a motor vehicle, a tandem rear drive including the dead axles on which the pairs of wheels are mounted, driving shaft sections for each of the wheels, a differential gear to which each pair of shaft sections is connected, a bevel gear carried by each differential gear, a bevel pinion meshing operatively with one of said bevel gears, a spur gear rotatable with said bevel pinion, a spur pinion in driving engagement with said spur gear, a hollow shaft on which said spur pinion is carried, a solid shaft extending through said hollow shaft and connected operatively with the other of said differential gears, a universal joint in said last named shaft, a differential gear including planetary pinions, a propeller shaft connected operatively with said planetary pinions and in substantial alinement with the hollow and solid shafts and two driving gears engaged by said pinions, one of said gears being connected to the said solid shaft and the other of said gears being connected to said hollow shaft.

This specification signed this 31st day of October, A. D. 1922.

AUGUST H. LEIPERT.